US011876865B2

(12) United States Patent
Lee et al.

(10) Patent No.: US 11,876,865 B2
(45) Date of Patent: Jan. 16, 2024

(54) METHOD OF AND APPARATUS FOR GENERATING SPACE FOR SHARING AUGMENTED REALITY CONTENT AMONG MULTIPLE PARTICIPANTS

(71) Applicant: ELECTRONICS AND TELECOMMUNICATIONS RESEARCH INSTITUTE, Daejeon (KR)

(72) Inventors: Beom Ryeol Lee, Daejeon (KR); Jeung Chul Park, Daejeon (KR); Wook Ho Son, Daejeon (KR); Yong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/953,891

(22) Filed: Sep. 27, 2022

(65) Prior Publication Data
US 2023/0164223 A1 May 25, 2023

(30) Foreign Application Priority Data
Nov. 22, 2021 (KR) .......................... 10-2021-0161457

(51) Int. Cl.
*G06F 15/16* (2006.01)
*H04L 67/131* (2022.01)
(Continued)

(52) U.S. Cl.
CPC .......... *H04L 67/131* (2022.05); *G02B 27/017* (2013.01); *G06T 19/006* (2013.01); *G02B 2027/0178* (2013.01)

(58) Field of Classification Search
CPC ................ H04L 67/131; G02B 27/017; G02B 2027/0178; G06T 19/006
(Continued)

(56) References Cited

U.S. PATENT DOCUMENTS

| 10,417,829 B2 | 9/2019 | Kim et al. |
| 10,599,213 B2 | 3/2020 | Yang et al. |
| 10,884,814 B2 * | 1/2021 | Sood ..................... H04L 9/0894 |

FOREIGN PATENT DOCUMENTS

| KR | 20190117415 A | 10/2019 |
| KR | 1020200114348 A | 10/2020 |

(Continued)

OTHER PUBLICATIONS

Dongsik Jo, et al., "AR Enabled IoT for a Smart and Interactive Environment: A Survey and Future Directions", Sensors, 2019, 19, 4330, MDPI, Oct. 7, 2019.
(Continued)

*Primary Examiner* — Alicia Baturay
(74) *Attorney, Agent, or Firm* — Rabin & Berdo, P.C.

(57) ABSTRACT

The present disclosure relates to a method of and an apparatus for generating a space for sharing augmented reality content among multiple participants. With the method and the apparatus, an object for configuring a virtual space, which is proposed in an actual space, can also be proposed, in a spatial matching manner on a per-user basis, inside a common sharing space in augmented reality content by utilizing the technology of generating a space for sharing augmented reality content among multiple participants.

15 Claims, 7 Drawing Sheets

(51) Int. Cl.
*G02B 27/01* (2006.01)
*G06T 19/00* (2011.01)

(58) Field of Classification Search
USPC .......................................... 709/204
See application file for complete search history.

(56) References Cited

FOREIGN PATENT DOCUMENTS

| KR | 102197615 B1 | 12/2020 |
| KR | 1020210061161 A | 5/2021 |
| KR | 20210086975 A | 7/2021 |
| KR | 1020220064242 A | 5/2022 |
| WO | WO-2023086475 A1 * | 5/2023 |

OTHER PUBLICATIONS

Mohammad Keshavarzi, et al., "Optimization and Manipulation of Contextual Mutual Spaces for Multi-User Virtual and Augmented Reality Interaction", ResearchGate, Feb. 9, 2020.

* cited by examiner

METHOD OF AND APPARATUS FOR GENERATING SPACE FOR SHARING AUGMENTED REALITY CONTENT AMONG MULTIPLE PARTICIPANTS

CROSS-REFERENCE TO RELATED APPLICATION

This application claims priority to and the benefit of Korean Patent Application No. 10-2021-0161457, filed on Nov. 22, 2021, the disclosure of which is incorporated herein by reference in its entirety.

BACKGROUND

1. Technical Field

The present disclosures relates to a method of and an apparatus for generating a space for sharing augmented reality content among multiple participants. With the method and the apparatus, an object for configuring a virtual space, which is proposed in an actual space, can also be proposed, in a spatial matching manner on a per-user basis, inside a common sharing space in augmented reality content by utilizing the technology of generating a space for sharing augmented reality content among multiple participants.

2. Related Art

Virtual reality and augmented reality technologies received attention again several years ago, and there have since been applications of them. The virtual reality technology realizes a complete virtual world, ensures an increase in immersion in the virtual world, and provides the convenience of performing operation by a controller. However, virtual reality does not reflect a real world at all.

In addition, in virtual reality content, virtual sharing spaces that users experience are all generated according to a planning intention of a content designer, and the generated virtual sharing spaces that have the same configuration are provided to the users. The users enter the same virtual space that is predetermined and experience content. Experience in the virtual reality content is experience that occurs inside a prepared single virtual space. Therefore, when a sharing space is generated in a virtual reality content execution environment, there is no need to consider configuration of spaces distinguished on a per-user basis. In addition, a content execution environment itself of the user does not impose any restriction on generation of a virtual sharing space.

However, augmented reality is achieved by superimposing a hologram on a real world, and thus a virtual object and a real-world object can be both seen. The augmented reality has the advantage of using a real-world object, but rather has the disadvantages, such as a decrease in a sensation of immersion and inconvenient operating.

In addition, in augmented reality (AR) content, a virtual sharing space has to be configured in a physical space of a participating user. Therefore, in terms of configuring a common sharing space on a per-user basis, there occurs the restriction that a separate reference for matching between a physical real-world space and a virtual space is necessary. There are issues associated with matching between a physical space and a virtual sharing space that are different from each other on a per-user basis. In this regard, problems occur, such as a mismatch in an arrangement of objects between the real-world space and the virtual space in generating the sharing space proposed to the users in the augmented reality content, an overlap between a real-world object and a virtual object inside the sharing space, and a collision therebetween.

SUMMARY

An object of the present disclosure, which is made to solve the above-mentioned problems, is to provide a method of and an apparatus for generating a space for sharing augmented reality content among multiple participants. With the method and the apparatus, an object for configuring a virtual space, which is proposed in an actual space, can also be proposed, in a spatial matching manner on a per-user basis, inside a common sharing space in augmented reality content by utilizing the technology of generating a space for sharing augmented reality content among multiple participants.

According to an aspect of the present disclosure, there is provided an apparatus for generating a space for sharing augmented reality content among multiple participants, the apparatus being connected to a plurality of AR glasses over a network, and the apparatus including: an AR space generation client unit configured to acquire a camera image and to propose an image for first AR glasses; and an AR space generation edge computing server unit connected to the AR space generation client unit over the network and configured to manage user information data, interaction quality quantification data, and AR space information data, wherein the AR space generation edge computing server unit includes: an AR sharing space processing unit configured to generate and maintain a real-world space object on which the first AR glasses are positioned, an AR space object, and an AR common sharing space object; an interaction processing unit configured to recognize interaction information from the first AR glasses, to access a space object inside AR content, and to process a result of recognizing the interaction information; an interaction quality quantification management unit configured to generate and store quantification data, based on which the degree of satisfaction of a user who wears the first AR glasses is objectively evaluated; and a server arithmetic-operation acceleration processing unit configured to perform optimization of computation algorithm on a functional processing unit included in the AR space generation edge computing server unit.

According to another aspect of the present disclosure, there is provided a method of generating a space for sharing augmented reality content among multiple participants, connections to a plurality of AR glasses being made over a network in the method, the method including: acquiring, by an AR space generation client unit, a camera image and proposing, by the AR space generation client unit, an image for first AR glasses; and managing, by an AR space generation edge computing server unit connected to the AR space generation client unit over the network, user information data, interaction quality quantification data, and AR space information data, wherein the managing by the AR space generation edge computing server unit of the user information data, the interaction quality quantification data, and the AR space information data includes: generating and maintaining, by an AR sharing space processing unit, a real-world space object on which the first AR glasses are positioned, an AR space object, and an AR common sharing space object; recognizing, by an interaction processing unit, interaction information from the first AR glasses, and accessing, by the interaction processing unit, a space object inside AR content, and processing, by the interaction processing unit, a result of recognizing the interaction information; generating and storing, by an interaction quality quantification management unit, quantification data, based on which the degree of satisfaction of a user who wears the first AR glasses is objectively evaluated; and performing, by a server arithmetic-operation acceleration processing unit, optimization of computation algorithm on a functional processing unit included in the AR space generation edge computing server unit.

According to still another aspect of the present disclosure, there is an apparatus for processing a space for sharing augmented reality content among multiple participants, the apparatus including: a physical space acquisition unit configured to generate three-dimensional space information of a space in which AR glasses are positioned, in the form of a real-world space object; a virtual space generation unit configured to generate an AR space object that is virtual space information and to designate access and control authorization information of a user; a sharing space configuration unit configured to select any one of the real-world space object and the AR space object and to designate the selected space object as a common AR sharing space object; and an AR space configuration unit configured to process a space object in such a manner as to be reflected in an AR content service according to an interaction intention of the user.

According to the present disclosure, there is provided an advantage in that, in a 5G mobile edge computing environment, multiple users who use 5G mobile terminals and wear lightweight AR glasses proposes an apparatus for generating a space for sharing AR content among users, the apparatus being configured to include an AR space sharing processing unit, an interaction processing unit, an interaction quality quantification management unit, and a server arithmetic-operation acceleration processing unit.

In addition, there is provided an advantage in that, while experiencing an AR content service, the multiple users who wear the AR glasses use a technique of designating the authorization of the user to access and control a real-world space object and an AR space object, using a method of generating a common AR sharing space among the multiple users.

In addition, there is an advantage in that a method of matching space objects is proposed in order to alleviate a problem of a mismatch in spatial arrangement between a real-world space object of an individual user and an AR space object by generating an AR sharing space.

In addition, a space object matching problem of a common AR sharing space among multiple users can be alleviated by generating the AR sharing space.

In addition, there is an advantage in that a method of sharing a common AR sharing space object with any other user and a space matching method are simplified by configuring a sharing space of the user through the utilization of a real-world space object and an AR sharing object.

DETAILED DESCRIPTION

Preferred embodiments of the present disclosure will be described below to help to get an understanding the present disclosure. However, embodiments of the present disclosure, provided below only towards an easier understanding of the present disclosure, do not impose any limitation on the present disclosure.

An apparatus for and a method of generating a space for sharing augmented reality content among multiple participants according to first and second embodiments, respectively, of the present disclosure will be described in detail below with reference to FIGS. 1 to 6.

Figure 1:
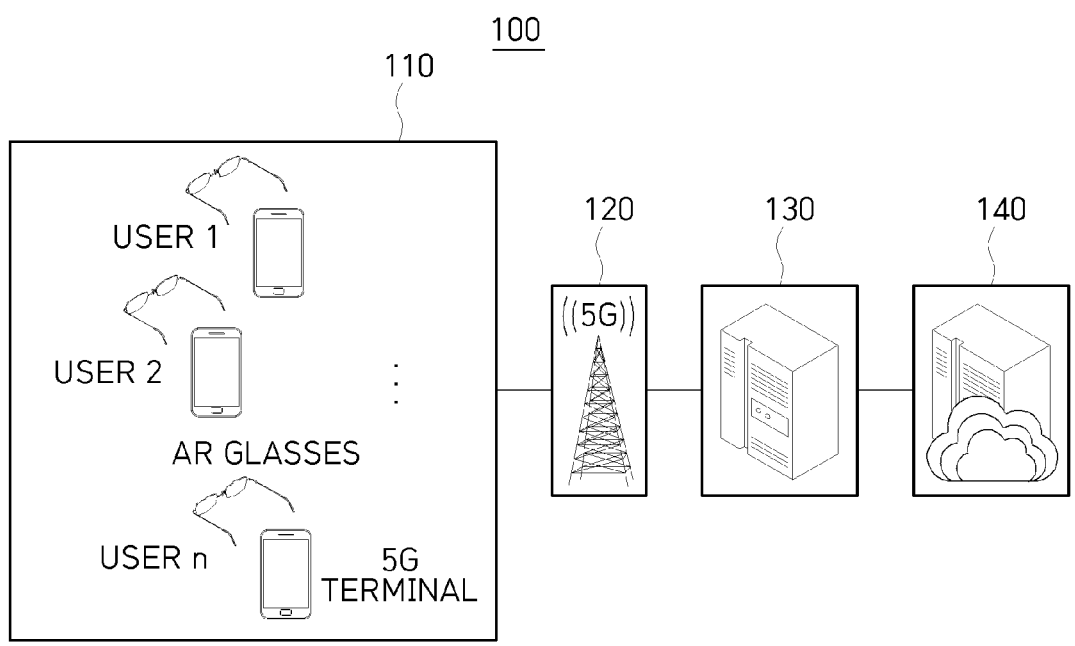
FIG. 1 is a diagram that is referred to for description of a general mobile edge computing operating environment according to a practical example of the present disclosure.

FIG. 1 is a diagram that is referred to for description of a general mobile edge computing operating environment according to a practical example of the present disclosure.

FIG. 1 illustrates a typical mobile edge computing operating environment, that is, an external environment for managing AR content where an apparatus for generating an AR space finds application.

Mobile edge computing here means a type of edge computing that results from expanding a cloud computing function by bring cloud computing to the edge of the Internet. In addition, the mobile edge computing is a network architecture that supports IT and the cloud computing function at the edge of a cellular network. Existing cloud computing occurs at a remote server that is remotely located from a user and an apparatus. However, use of the mobile edge computing makes it possible to perform a process at a base station of a network, a central office, and other points.

A mobile edge computing operation environment may be configured to include an AR space generation client unit 110 including AR glasses and a 5G terminal, a 5G base station and 5G dedicated network 120, an AR space generation edge computing server unit 130, and a cloud server 140.

A user makes a connection to the AR content while wearing the lightweight AR glasses. In an environment of the 5G dedicated network, a connection is made to the edge computing server unit 130 through the 5G terminal connected to the AR glasses.

The edge computing server unit 130 is in charge of AR content management and data processing. In this environment, the user makes a connection to a service for the 5G dedicated network 120 through the 5G base station 120 that is the closest to the user. Thus, through a mobile edge computing environment, the user experiences an AR content service function that requires an ultra-low latency characteristic. The AR content service function that does not require the ultra-low latency characteristic may also be utilized, together with a basic service built in the cloud server 140.

The embodiments of the present disclosure are also practiced in a basic mobile edge computing operating environment. Therefore, the same reference numbers as in the mobile edge computing operating environment are hereinafter used.

Figure 2:
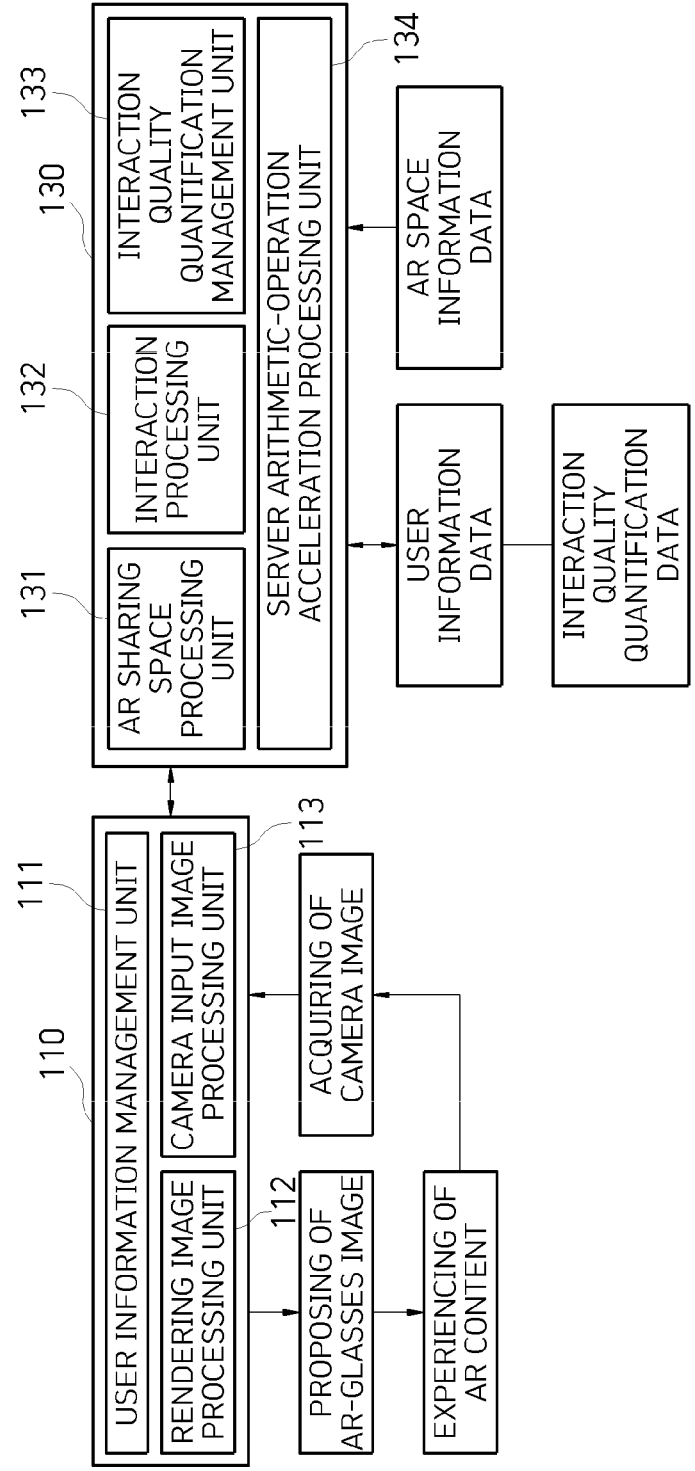
FIG. 2 is a diagram that is referred to for description of an apparatus for generating a space for sharing augmented reality content among multiple participants according to a first embodiment of the present disclosure.

FIG. 2 is a diagram that is referred to for description of an apparatus 100 for generating a space for sharing augmented reality content among multiple participants according to a first embodiment of the present disclosure.

With reference to FIG. 2, the apparatus 100 for generating a space for sharing augmented reality content among multiple participants may be configured to include the AR space generation client unit 110 and the AR space generation edge computing server unit 130.

The AR space generation client unit 110 here may be configured to include a user information management unit 111, a rendering image processing unit 112, and a camera input image processing unit 113.

User information and AR content data information may be processed through the user information management unit 111. In a state where the AR glasses are worn, the rendering image processing unit 112 may provide on an AR-glasses screen a three-dimensional AR space object information, which results from executing the AR content processed in the AR space generation edge computing server unit 130, in a pass-through fashion. Pass-through here may mean a function in which an ambient environment is enabled to be seen while the AR glasses or a VR headset is worn, using a camera connected to the AR glasses or the VR headset. Accordingly, while the AR glasses are worn, the three-dimensional AR space object information may apply to the AR content, and the resulting three-dimensional AR space object information may be provided on an AR-glasses screen.

In addition, image information that is input from a single RGB camera mounted on the AR glasses may be received through the camera input image processing unit 113, a real-world space object corresponding to an ambient physical space in which the user who wears the AR glasses stays may be generated, and thus an interaction motion of the user may be recognized.

The AR space generation edge computing server unit 130 may manage user information data, interaction quality quantification data, and AR space information data and may be configured to include an AR sharing space processing unit 131, an interaction processing unit 132, an interaction quality quantification management unit 133, and a server arithmetic-operation acceleration processing unit 134.

The AR sharing space processing unit 131 may generate and maintain a real-world space object on which first AR glasses are positioned, an AR space object, and an AR common sharing space object.

More specifically, the AR sharing space processing unit 131 may be configured to include a physical space information acquisition unit 131-1, a virtual space generation unit 131-2, a sharing space configuration unit 131-3, and an AR space configuration unit 131-4.

The physical space information acquisition unit 131-1 may generate three-dimensional space information on a real-world space in which the first AR glasses are positioned, in the form of the real-world space object. The virtual space generation unit 131-2 may generate the AR space object that is virtual space information to be added to the real-world space object and may store access and control authorization information of the user.

In addition, the sharing space configuration unit 131-3 may select any one space object of the real-world space object and the AR space object and may designate a characteristic variable value of the space object as representing a common AR sharing space object and may generate the common AR sharing space object.

In addition, the AR space configuration unit 131-4 may perform space object processing for reflecting the common AR sharing space object in an AR content service according to an interaction intention.

The interaction processing unit 132 may recognize interaction information from the first AR glasses, may access the space object inside the AR content, and may process a result of interaction that varies with the intention of the user.

In addition, the interaction quality quantification management unit 133 may generate and store quantification data, based on which the degree of satisfaction of the user who wears the first AR glasses is objectively evaluated.

The AR space generation edge computing server unit 130 may include a functional processing unit for performing a function. The server arithmetic-operation acceleration processing unit 134 may perform optimization of computation algorithm on the functional processing unit included in the AR space generation edge computing server unit 130.

In addition, as illustrated in FIG. 1, the apparatus 100 for generating a space for sharing augmented reality content among multiple participants according to the first embodiment of the present disclosure may be connected to the cloud server 140 over a network, and the cloud server 140 may be connected to the AR space generation edge computing server unit 130 over a network. Basic service data may be stored in the cloud server 140.

Figure 3A:
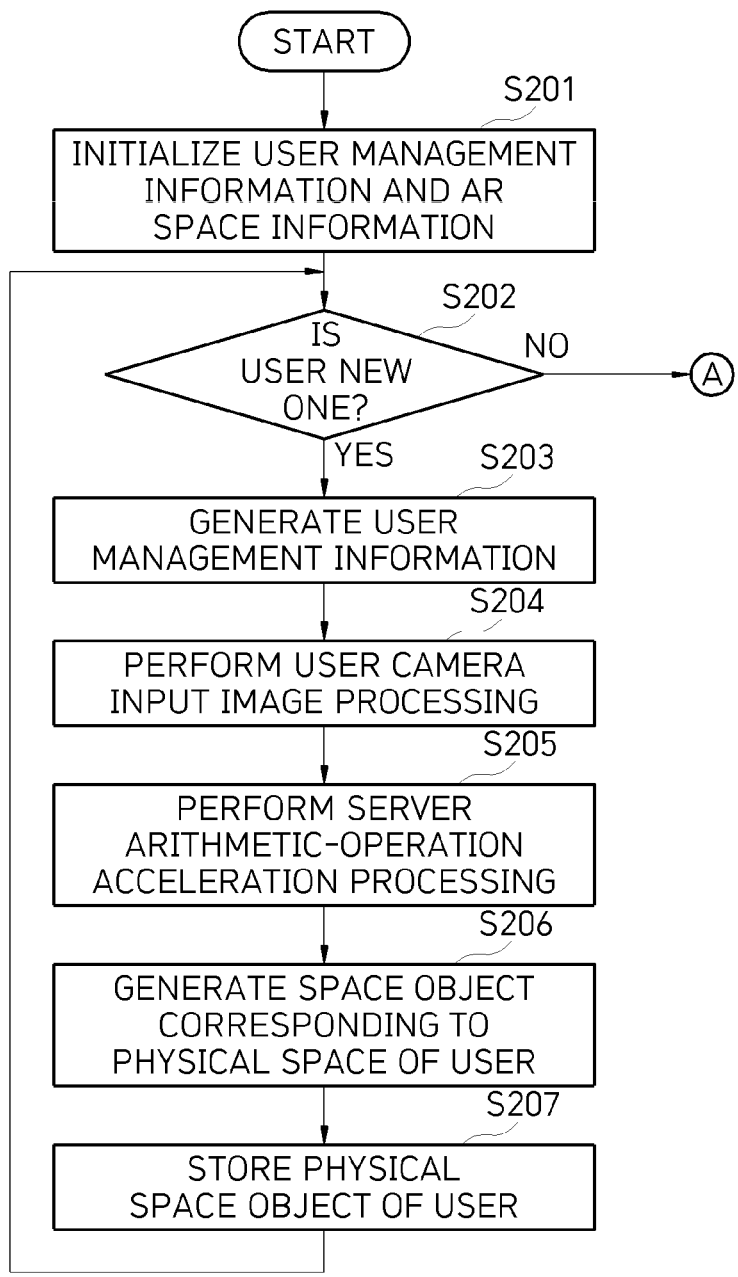
FIGS. 3A and 3B are flowchart that is referred to for description of a method of generating a space for sharing augmented reality content among multiple participants according to a second embodiment of the present disclosure.
Figure 3B:
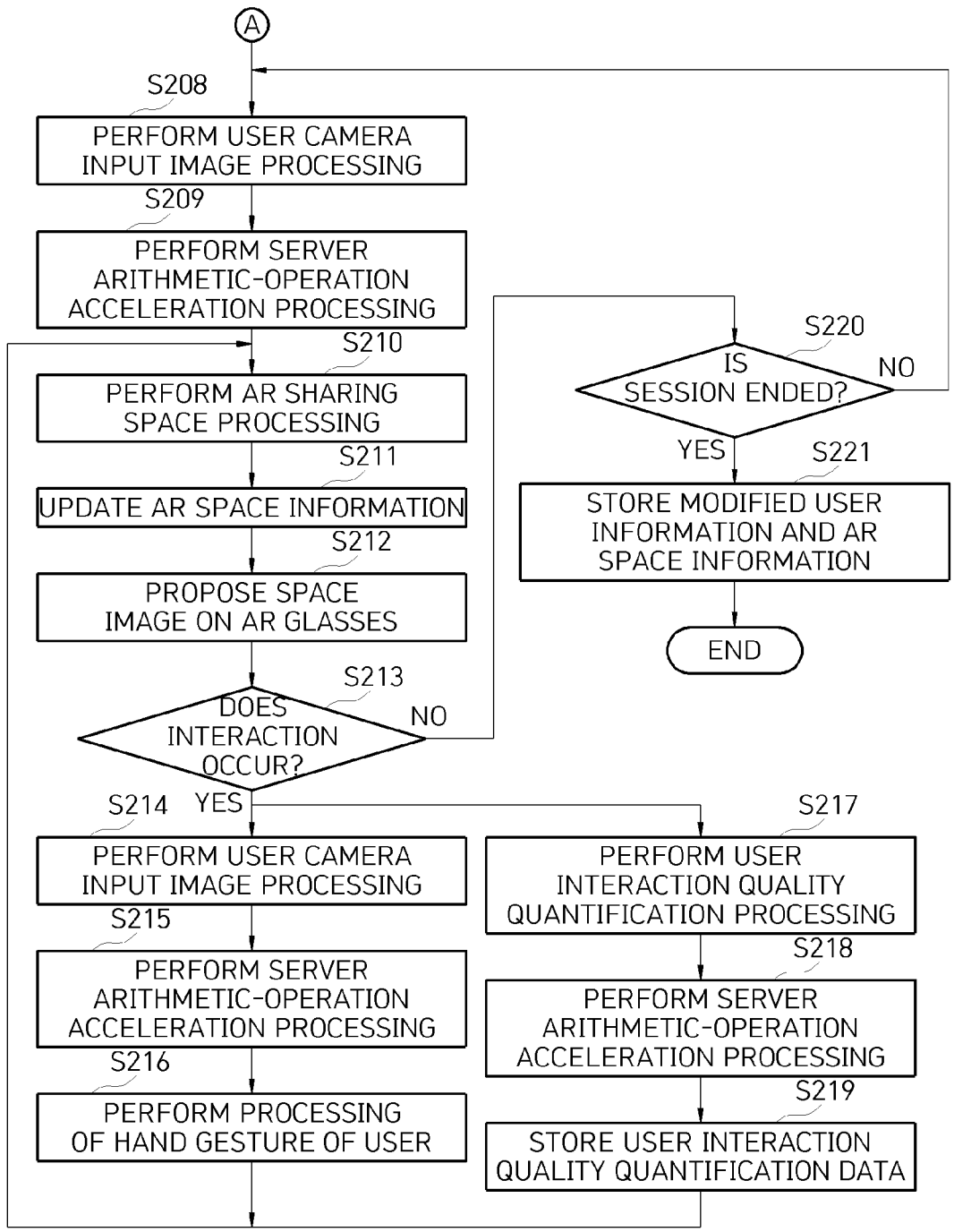

FIGS. 3A and 3B are flowchart that is referred to for description of a method of generating a space for sharing augmented reality content among multiple participants according to a second embodiment of the present disclosure.

FIGS. 3A and 3B are operational flowchart for executing the AR content service by utilizing the AR space generation client unit and the AR space generation edge computing server unit. Multiple users may experience the AR content service by driving the AR space generation client unit and the AR space generation edge computing server unit. Typical service functions here for executing the AR content service that the multiple users experience may include a function of generating a real-world space object corresponding to a physical space of the user, a both-hands gesture recognition function of recognizing a motion of the user who wears the AR glasses, and an interaction quality quantification processing function. Particularly, the server arithmetic-operation acceleration processing unit 134 may belong to a basic common functional processing unit for ultra-low latency service processing in response to an interaction request by the user.

The AR content service for the user who wears the AR glasses is executed, and, at the same time, an AR space information data structure connected to the user information data and the user information data may be initialized (S201). In a case where the user is a new one (YES in S202), the user information data may be generated (S203). Then, an input image of the RGB camera mounted on the AR glasses of the user may be processed (S204). Then, a server arithmetic-operation acceleration processing may be performed through a server arithmetic-operation acceleration processing unit (S205). Then, the real-world space object corresponding to the physical space of the user may be generated (S206). Then, the physical space of the user may be stored as the real-world space object of the user (S207).

The real-world space object that is physical space information of the user, along with the AR space object of the user, may be later utilized to constitute an AR content space. Of the real-world space object of the user and the AR space object, the space object to be shared with any other user may be changed to a common AR sharing object by designating an object characteristic value.

In a case where the user is not a new one, without generating the user information data, the input image may be processed through the RGB camera mounted on the AR glasses (S208). Then, the server arithmetic-operation acceleration processing may be performed though the server arithmetic-operation acceleration processing unit (S209). Then, AR sharing space processing may be performed on image data that are input (S210). The AR space information data is updated (S211). Then, an AR space image may be proposed through processing of space image rendering image on the AR glasses of the user (S212). For processing in response to the interaction motion of the user, user camera input image processing (S214) may be performed by performing a server arithmetic-operation acceleration processing function (S215). Then, the interaction (both-hands gesture motion of the user) may be recognized, and then corresponding interaction processing may be completed. Then, AR sharing space information processing may be performed by proposing a result of the interaction processing to the AG glasses of the user (S216). In order to handle an interaction processing request by the user and, at the same time, perform user interaction quality quantification processing (S217), server arithmetic-operation acceleration processing may be performed (S218), and a result of the server computation acceleration processing may be stored in the interaction quality quantification data of the user (S219). A request may be made to end the AR content service for experiencing by multiple participating users (S220). Along with this, content updates on the user information and AR space information may be stored, and then the AR content service may be ended (S221).

Figure 4:
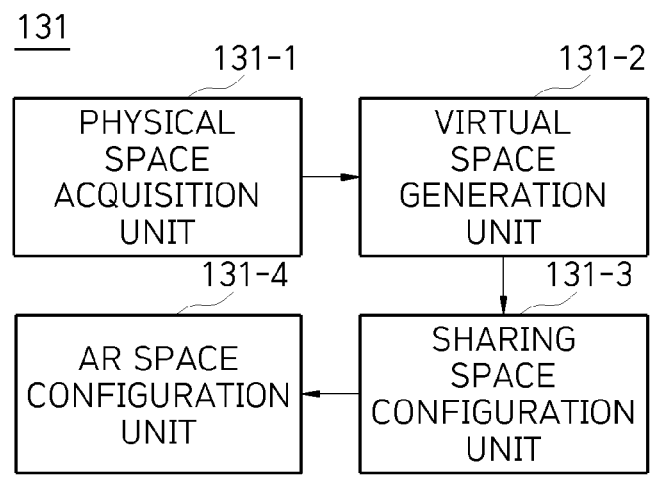
FIG. 4 is a diagram that is referred to for description of an AR sharing space processing unit 131 according to a practical example of the present disclosure.

FIG. 4 is a diagram that is referred to for description of the AR sharing space processing unit 131 according to a practical example of the present disclosure.

With reference to FIG. 4, the AR sharing space processing unit 131 may be configured to include the physical space information acquisition unit 131-1, the virtual space generation unit 131-2, the sharing space configuration unit 131-3, and the AR space configuration unit 131-4.

The physical space information acquisition unit 131-1 may generate the three-dimensional space information on an actual physical space in which the AR glasses are positioned, in the form of the real-world space object. The virtual space generation unit 131-2 may generate the AR space object that is virtual information to be added to the real-world space object of the user and may designate the access and control authorization information of the user.

The sharing space configuration unit 131-3 may select any one space object of the real-world space object and the AR space object and may designate the characteristic variable value of the space object as representing the common AR sharing space object and may generate the common AR sharing space object. In other words, the user who experiences the AR content service may select the common AR sharing space object to be shared with any other user, from between the real-world space object and the AR space object, may designate the characteristic variable value of the space object as representing the common AR sharing space object, and thus may generate the AR space object. The sharing here with any other user may mean sharing with any other user of a plurality of AR glasses that include first AR glasses, second AR glasses, third AR classes, and so forth up to N-th AR glasses and the common AR sharing space object selected from the first AR glasses.

The AR space configuration unit 131-4 may perform the space object processing for reflecting the common AR sharing space object in the AR content service according to the interaction intention. In other words, the space object may be processed in such a manner that the common AR sharing space objects that are being shared with any other user can be reflected in the AR content service in a timely manner according to the interaction intention of the user. The AR space object information here processed may be reflected in conversion into a suitable AR space that falls within each user's field of view and thus may be proposed as the AR space object on the AR glasses of the user.

Figure 5:
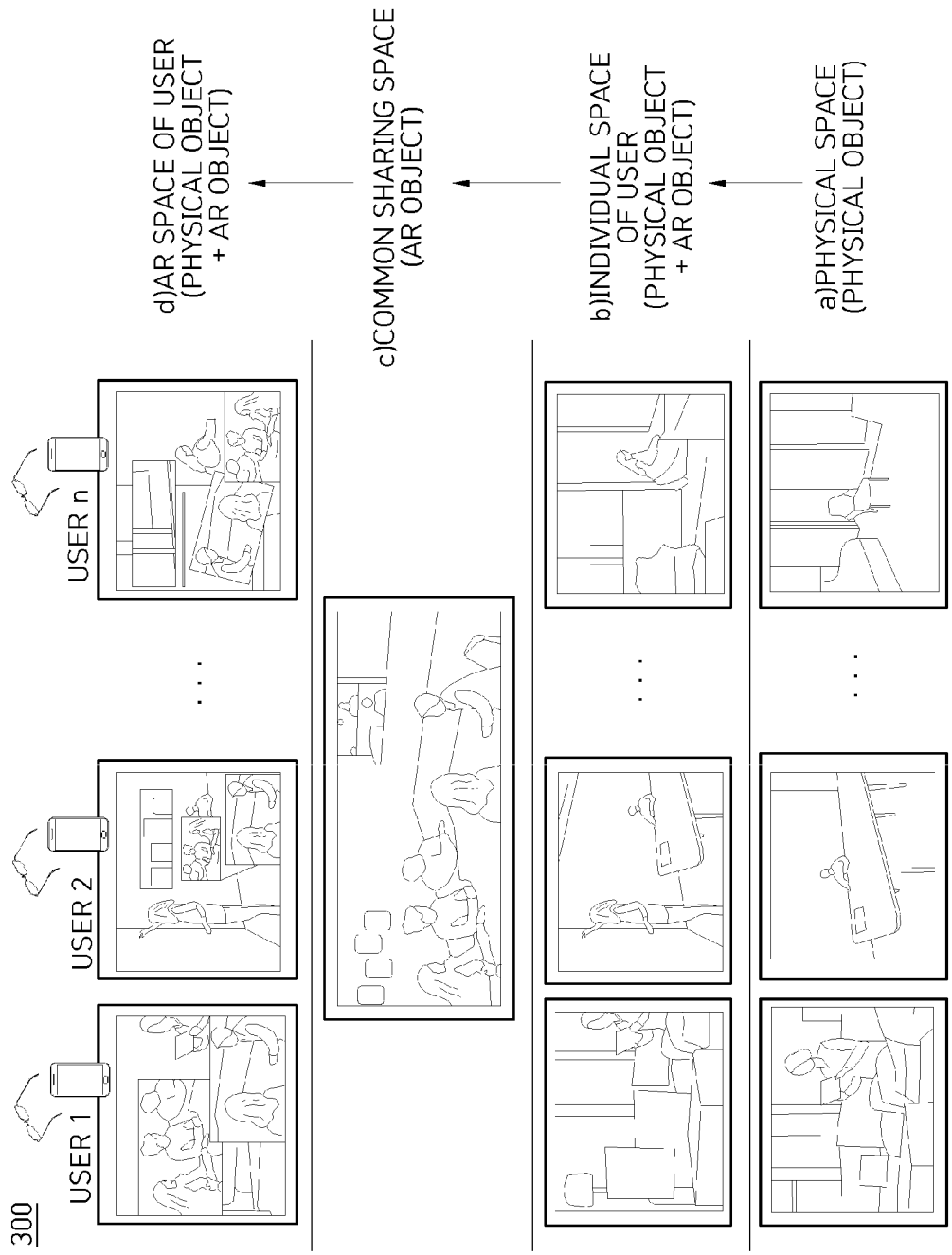
FIG. 5 is a diagram that is referred to for description of an exemplary configuration of a procedure for the processing by the AR sharing space processing unit according to the practical example of the present disclosure.

FIG. 5 is a diagram that is referred to for description of an exemplary configuration of a procedure for the processing by the AR sharing space processing unit 131 according to the practical example of the present disclosure.

Examples of a place where the user is positioned include a living room, a conference room, and a bedroom, as the most common user environments. The generation of the common AR sharing object among multiple users in a contact-free multiuser situation causes a problem of integrating a common space among individual spaces that are maintained on a per-user basis and a spatial matching issue of positioning the common sharing space within a user space. In order to find suitable-level solutions to the problem and the issue that are consistent with the purpose of multiple users to share the AR space when they experience the AR content service, the three-dimensional space information on a physical space in which an individual user (the AR glasses are positioned) is positioned is acquired and the real-world space object is generated ("a) a physical space"). Thereafter, for any other user, there may be a need for conversion into the common AR sharing space object at a level consistent with the intention of manufacturing the AR content. Eventually, an individual space of the user may be configured as a virtual space object through spatial matching between the real-world space object and the AR space object ("b) an individual space of the user). In order to make the real-world space object of the individual user and the AR space object the common sharing space for multiple other users, an object characteristic parameter indicating the common AR sharing space object may be designated for the space object that is to be proposed as the common sharing space of the AR content, of the real-world space object and the AR space object. Thus, a common AR sharing space among the users may be generated in an AR content service experimental environment ("c) a common sharing space). Multiple users who experience an AR content service may perform conversion processing for the common AR sharing space object through both-hands gesture recognition that is consistent with the interaction intention of the individual user ("d) an AR space of the user). The conversion for the space object inside the common AR sharing space of the user, which is performed by the multiple users who experience the AR content service, is position-restricted inside a space according to an arrangement of real-world space objects of the individual users. In addition, there is a need for positional matching between space objects proposed on the AR glasses according to a position of the individual user (positions of the AR glasses) in the AR content and to a line of sight. To solve this problem, the AR sharing space processing unit 131 may change authorization of the user to access and control each space object.

Figure 6:
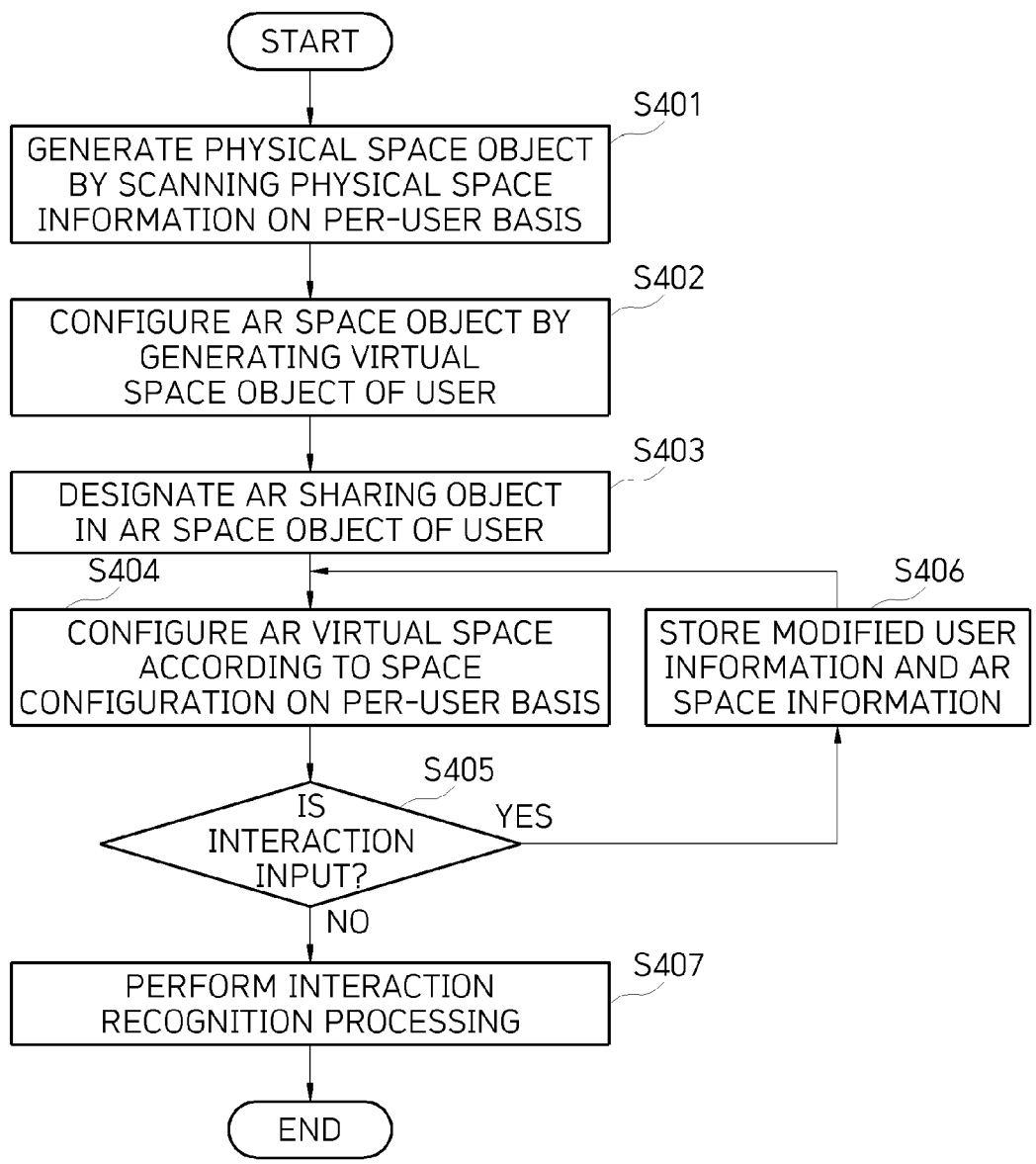
FIG. 6 is a flowchart that is referred to for description of a method of processing by the AR sharing space processing unit according to the practical example of the present disclosure.

FIG. 6 is a flowchart that is referred to for description of a method of processing by the AR sharing space processing unit 131 according to the practical example of the present disclosure.

A physical three-dimensional space information on the space in which the individual user is positioned (the space in which the AR glasses are positioned) is scanned and a result of the scanning is stored in a database (S401). Thus, the conversion into the real-world space object is also performed on a physical space at a level that can handle virtual space data (S402). The AR space object, resulting from the conversion, which reflects the intention of the user to experience the AR content space is arranged together with the generated real-world space object. At this time, the spatial matching between the real-world space object and the AR space object is performed in order to arrange the real-world space object and the AR space object inside an AR content service space. In the AR space object of the user, an object to be shared with any other user is designated as the common AR sharing object (S403). The conversion of the AR space object of the user is performed in such a manner as to reflect a result of this recognition (S404). It is determined whether or not the user interaction is input (S405), and then, when the interaction (the both-hands gesture of the user) is recognized, an AR virtual space is again configured (S406). When inputting of the user interaction is ended, the content update on the user information and the AR space information of the user are stored (S407).

The second embodiment of the present disclosure may be realized as a program (or an application) and then stored on a medium in order to be practiced in a state of being combined with a computer that is hardware.

In order for the computer to read the above-mentioned program and perform the method realized as the above-mentioned program, the above-mentioned program may include codes that result from performing coding using computer languages, such as Golang, C, C++, JAVA, Javascript, Ruby, Python, Solidity, and a machine language, which are readable by a processor (CPU) of the computer through a device interface of the computer. These codes may include functional codes associated with a function, defining functions necessary to perform the method, or the like, and may include control codes associated with an execution procedure necessary for the processor of the computer to perform the functions according to a predetermined procedure. In addition, these codes may further include codes, associated with memory reference, that indicate at which position (address) in an internal or external memory of the computer, additional information or a medium necessary for the processor of the computer to perform these functions is referred to. In addition, in a case where communication with any other computer or server that is remotely located is necessary in order for the processor of the computer to perform the functions, the codes may further include communication-associated codes that indicate how communication with any other computer or server that is remotely located is performed using a communication module of the computer, which information or a medium is to be transmitted or received while the communication is performed, and the like.

The medium on which the program is stored means a computer-readable medium on which data are stored semi-permanently, instead of a medium, such as a register, a cache, and a memory, on which data are stored for a short moment. Specifically, examples of the medium on which the program is stored include a ROM, a RAM, a CD-ROM, a magnetic tape, a floppy disk, an optical data storage device, and the like, but are not limited thereto. That is, the program may be stored on various recording media in various servers to which the computer can make a connection, or various media in the computer of the user. In addition, the media are distributed to computer systems connected to each other over a network, and computer-readable codes may be stored in the media in a distributed manner.

The embodiments of the present disclosure are described above in an exemplary manner. It would be understood by a person of ordinary skill in the art to which the present disclosure pertains that the embodiments of the present disclosure are readily modified into other specific forms without changing the technical idea of the present disclosure and essential features thereof. Therefore, in all aspects, the embodiments described above should be understood as being exemplary and non-restrictive. For example, the constituent elements that are described as having their respective single forms may be practiced in a distributed manner, and likewise, the constituent elements that are described as being distributed may be practiced in a combined manner.

The scope of the present disclosure is defined by the following claims rather than by the detailed description provided above. All modifications and alterations that are included within the scope of the claims in terms of meaning and are derived from any equivalents to the constituent elements should be interpreted as falling within the scope of the present disclosure.

What is claimed is:

1. An apparatus for generating a space for sharing augmented reality content among multiple participants, the apparatus being connected to a plurality of AR glasses over a network, and the apparatus comprising:
   an AR space generation client unit configured to acquire a camera image and to propose an image for first AR glasses; and
   an AR space generation edge computing server unit connected to the AR space generation client unit over the network and configured to manage user information data, interaction quality quantification data, and AR space information data,
   wherein the AR space generation edge computing server unit comprises:
   an AR sharing space processing unit configured to generate and maintain a real-world space object on which the first AR glasses are positioned, an AR space object, and an AR common sharing space object;
   an interaction processing unit configured to recognize interaction information from the first AR glasses, to access a space object inside AR content, and to process a result of recognizing the interaction information;
   an interaction quality quantification management unit configured to generate and store quantification data, based on which the degree of satisfaction of a user who wears the first AR glasses is objectively evaluated; and
   a server arithmetic-operation acceleration processing unit configured to perform optimization of computation algorithm on a functional processing unit included in the AR space generation edge computing server unit.

2. The apparatus of claim 1, wherein the AR space generation client unit comprises:
   a user information management unit configured to process user information and AR content data information;
   a rendering image processing unit configured to propose three-dimensional AR space object information resulting from executing the AR content processed in the AR space generation edge computing server unit, on an AR-glasses screen; and
   a camera input image processing unit configured to receive image information that is input from a single RGB camera, to generate the real-world space object, and to recognize an interaction motion of the user.

3. The apparatus of claim 1, wherein the AR sharing space processing unit comprises:
a physical space information acquisition unit configured to generate three-dimensional space information on a real-world space in which the first AR glasses are positioned, in the form of the real-world space object;
a virtual space generation unit configured to generate the AR space object that is virtual space information to be added to the real-world space object and to designate access and control authorization information of the user;
a sharing space configuration unit configured to select any one space object of the real-world space object and the AR space object, to designate a characteristic variable value of the space object as representing a common AR sharing space object, and to generate the common AR sharing space object; and
an AR space configuration unit configured to perform space object processing for reflecting the common AR sharing space object in the AR content service according to an interaction intention.

4. The apparatus of claim 1, further comprising:
a cloud server connected to the AR space generation edge computing server unit over the network and configured to store basic service data.

5. The apparatus of claim 2, wherein the rendering image processing unit is configured to propose the three-dimensional AR space object information on the AR-glasses screen in a pass-through fashion.

6. The apparatus of claim 3, wherein the sharing space configuration unit is configured to share the common AR sharing space object with a plurality of AR glasses that include the first AR glasses.

7. A method of generating a space for sharing augmented reality content among multiple participants, connections to a plurality of AR glasses being made over a network in the method, the method comprising:
acquiring, by an AR space generation client unit, a camera image and proposing, by the AR space generation client unit, an image for first AR glasses; and
managing, by an AR space generation edge computing server unit connected to the AR space generation client unit over the network, user information data, interaction quality quantification data, and AR space information data,
wherein the managing by the AR space generation edge computing server unit of the user information data, the interaction quality quantification data, and the AR space information data comprises:
generating and maintaining, by an AR sharing space processing unit, a real-world space object on which the first AR glasses are positioned, an AR space object, and an AR common sharing space object;
recognizing, by an interaction processing unit, interaction information from the first AR glasses, and accessing, by the interaction processing unit, a space object inside AR content, and processing, by the interaction processing unit, a result of recognizing the interaction information;
generating and storing, by an interaction quality quantification management unit, quantification data, based on which the degree of satisfaction of a user who wears the first AR glasses is objectively evaluated; and
performing, by a server arithmetic-operation acceleration processing unit, optimization of computation algorithm on a functional processing unit included in the AR space generation edge computing server unit.

8. The method of claim 7, wherein the acquiring and proposing of the camera image and the image for first AR glasses, respectively, comprises:
processing, by a user information management unit, user information and AR content data information;
proposing, by a rendering image processing unit, three-dimensional AR space object information resulting from executing the AR content processed in the AR space generation edge computing server unit, on an AR-glasses screen; and
receiving, by a camera input image processing unit, image information that is input from a single RGB camera, generating, by the camera input image processing unit, a real-world space object, and recognizing, by the camera input image processing unit, an interaction motion of the user.

9. The method of claim 7, wherein the generating and maintaining of the real-world space object comprises:
generating, by a physical space information acquisition unit, three-dimensional space information on a real-world space in which the first AR glasses are positioned, in the form of the real-world space object;
generating, by a virtual space generation unit, the AR space object that is virtual space information to be added to the real-world space object and designating, by the virtual space generation unit, access and control authorization information of the user;
selecting, by a sharing space configuration unit, any one space object of the real-world space object and the AR space object, designating, by the sharing space configuration unit, a characteristic variable value of the space object as representing a common AR sharing space object, and, generating, by the sharing space configuration unit, the common AR sharing space object; and
performing, by an AR space configuration unit, space object processing for reflecting the common AR space sharing object in the AR content service according to an interaction intention.

10. The method of claim 7, further comprising:
storing, by a cloud server connected to the AR space generation edge computing server unit over the network, basic service data.

11. The method of claim 8, wherein the proposing of the three-dimensional AR space object information comprises:
proposing the three-dimensional AR space object information on the AR-glasses screen in a pass-through fashion.

12. The method of claim 9, wherein the selecting, designating, and generating of any one space object, the characteristic variable value, and the characteristic variable value, respectively, comprises:
sharing the common AR sharing space object with a plurality of AR glasses.

13. An apparatus for processing a space for sharing augmented reality content among multiple participants, the apparatus comprising:
a physical space acquisition unit configured to generate three-dimensional space information of a space in which AR glasses are positioned, in the form of a real-world space object;
a virtual space generation unit configured to generate an AR space object that is virtual space information and to designate access and control authorization information of a user;
a sharing space configuration unit configured to select any one of the real-world space object and the AR space object and to designate the selected space object as a common AR sharing space object; and an AR space configuration unit configured to process a space object in such a manner as to be reflected in an AR content service according to an interaction intention of the user.

14. The apparatus of claim 13, wherein the sharing space configuration unit is configured to share the selected common AR sharing space object with a plurality of AR-glasses screens.

15. The apparatus of claim 14, wherein the AR space configuration unit is configured to reflect the processed space object information in AR space conversion in such a manner as to fall within a viewing angle of each of the plurality of AR-glasses screens and to propose the resulting object information to the plurality of AR glasses.

* * * * *